United States Patent
Emele et al.

(10) Patent No.: US 9,483,665 B2
(45) Date of Patent: Nov. 1, 2016

(54) METHOD FOR MONITORING AN ELECTRONIC SECURITY MODULE

(71) Applicant: Robert Bosch GmbH, Stuttgart (DE)

(72) Inventors: Martin Emele, Stuttgart (DE); Thomas Keller, Rottweil (DE); Ingo Opferkuch, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/705,661

(22) Filed: May 6, 2015

(65) Prior Publication Data
US 2015/0324218 A1    Nov. 12, 2015

(30) Foreign Application Priority Data
May 12, 2014  (DE) .................. 10 2014 208 848

(51) Int. Cl.
  *G06F 9/455*   (2006.01)
  *G06F 21/79*   (2013.01)
  *G06F 9/48*    (2006.01)

(52) U.S. Cl.
  CPC ........... *G06F 21/79* (2013.01); *G06F 9/45533* (2013.01); *G06F 9/45558* (2013.01); *G06F 9/4843* (2013.01); *G06F 2009/45583* (2013.01); *G06F 2009/45587* (2013.01)

(58) Field of Classification Search
  CPC ... G06F 9/45533; G06F 9/4843; G06F 12/14
  USPC ..................... 718/1, 100; 711/163
  See application file for complete search history.

(56) References Cited

U.S. PATENT DOCUMENTS

| | | | | |
|---|---|---|---|---|
| 8,156,298 | B1* | 4/2012 | Stubblefield | G06F 12/1433 711/163 |
| 2006/0236127 | A1* | 10/2006 | Kurien | G06F 9/5077 713/193 |
| 2009/0150510 | A1* | 6/2009 | Kovacs | G06F 11/1464 709/213 |
| 2009/0199017 | A1* | 8/2009 | Lange | G06F 21/79 713/194 |
| 2011/0197060 | A1* | 8/2011 | Mukherjee | G06F 21/57 713/155 |
| 2012/0173842 | A1* | 7/2012 | Frey | G06F 9/45558 711/207 |
| 2013/0297901 | A1* | 11/2013 | Nakada | G06F 12/1416 711/163 |
| 2014/0068133 | A1* | 3/2014 | Tkacik | G06F 13/1694 710/308 |
| 2014/0082690 | A1* | 3/2014 | Ju | G06F 21/53 726/1 |
| 2015/0046920 | A1* | 2/2015 | Allen | G06F 9/50 718/1 |
| 2015/0347052 | A1* | 12/2015 | Grisenthwaite | G06F 12/1425 711/163 |
| 2015/0358161 | A1* | 12/2015 | Kancharla | H04L 63/0485 713/164 |

OTHER PUBLICATIONS

Coppola et al., "Trusted Computing on Heterogeneous Embedded Systems-on-Chip with Virtualization and Memory Protection", 2013.*
Kwon et al., "Information Security and Cryptology", 2012.*
Stumpf et al., "Enhancing Trusted Platform Modules with Hardware-Based Virtualization Techniques", 2008.*

* cited by examiner

*Primary Examiner* — Phillip H Nguyen
(74) *Attorney, Agent, or Firm* — Norton Rose Fulbright US LLP; Gerard Messina

(57) ABSTRACT

A method and a computer program are provided for implementing memory accesses. A hypervisor is used for this purpose, via which the memory access takes place.

12 Claims, 3 Drawing Sheets

METHOD FOR MONITORING AN ELECTRONIC SECURITY MODULE

CROSS REFERENCE TO RELATED APPLICATION

The present application claims priority to Application No. DE 10 2014 208 848.8, filed in the Federal Republic of Germany on May 12, 2014, which is incorporated herein in its entirety by reference thereto.

FIELD OF INVENTION

The present method relates to a method for monitoring an electronic security module and to a computer program for implementing the method, which is also referred to as hypervisor.

BACKGROUND INFORMATION

Control units are electronic modules which, for instance, are used in motor vehicles for the control and regulation of functional sequences. For this purpose the control units are assigned to the particular components of the motor vehicle whose operation will be controlled with the aid of the assigned control unit. In order to do so, the control unit reads in data acquired by sensors and influences the operation by controlling actuators.

The described method is used in conjunction with an electronic security module which is utilized in a control unit, especially in the automotive field, in security-relevant areas. The manipulation-proof or non-monitorable storing of data is an essential requirement in most applications in the security-relevant areas. Cryptographic keys, which are utilized in symmetrical or asymmetrical encryption methods, are used for this purpose.

The employed codes and encryption methods constitute secrets that need to be kept hidden from attackers. Other uses in security-relevant areas, for instance, concern the protection against unauthorized modifications, such as the storing of changed serial numbers or tachometer readings, the prevention of unauthorized tuning measures, etc.

Hence it is necessary to provide secure environments in control units, in which functionalities that must have access to and/or modify these secrets, can be executed. These environments normally have a secure computer unit or CPU, also referred to as secure CPU, as well as a storage module. An environment of this type is called a hardware security module (HSM) in this context. It represents a high-performance module, which includes hardware and software components and improves the security and trustworthiness of embedded systems. The HSM in particular helps in protecting security-critical applications and data. The security costs are also able to be reduced by an HSM, while effective protection against attackers is offered at the same time. As far as the basic structure of an HSM is concerned, reference is made to FIG. 3.

SUMMARY OF THE INVENTION

Against this background, a method and a computer program having the features described herein are provided. Refinements of the method and the computer program can be gathered from the descriptions herein and the specification.

According to the presented method, applications together with associated keys or data are strictly separated from the system resources, including the basic software functionalities, within the HSM, the main computer cores or main cores, or in a combination of both.

The introduced computer program, which is also referred to as hypervisor in this text, is executed on a computer unit, especially a computer unit in an electronic hardware security module (HSM).

A hypervisor is therefore utilized in the method. This hypervisor, which is also known as a virtual machine monitor, is a computer program which provides a virtual machine. This hypervisor constitutes a superposed instance, which can control and possibly prevent applications. More specifically, the hypervisor regulates access to resources and memories and the execution of software with regard to the duration, instant and repetition rate.

All hardware resources in the HSM are exclusively administered by a hypervisor. This enables a clear separation of different applications that are executed in the HSM. Mutual interference, either selective or random, is impossible, for instance by the use of the MPU (memory protection unit), among others.

The hypervisor functionality is based on the MPU in the HSM and the differentiation of the system user modes. In other words, all applications are executed in the user mode, and access to system and hardware resources is possible only via defined APIs. A user mode is a restricted operating mode for the applications; for instance, the application can use only an allocated memory, allocated time slots as well as APIs. Another advantage is that the crypto- or security functionalities implemented in the software are strictly separated or protected from the remaining application and can be called up only via a defined API.

The hypervisor in the main computer or main core(s) operates independently of the use in the HSM. This constitutes a mechanism for protecting the operating system.

The essential features of the hypervisor in the HSM apply here, as well. In addition, the hypervisor software is able to be secured via the secure boot feature in the control-unit run-up, so that the application software is no longer able to be manipulated in the ongoing operation. The code basis of the hypervisor is rather small and can therefore be certified completely. As an alternative, the hypervisor code is also storable in the HSM and can be loaded into and executed on the main core RAM during the control-unit run-up.

Another option consists of encrypting the hypervisor code and decoding it during the control-unit run-up via the HSM and allowing it to be executed from the RAM.

Additional advantages and developments of the present invention derive from the specification and the appended figures.

It is understood that the features mentioned above and the features yet to be described may be used not only in the individually given combination but in other combinations or in isolation as well, without departing from the scope of the present invention.

DETAILED DESCRIPTION

Figure 1:
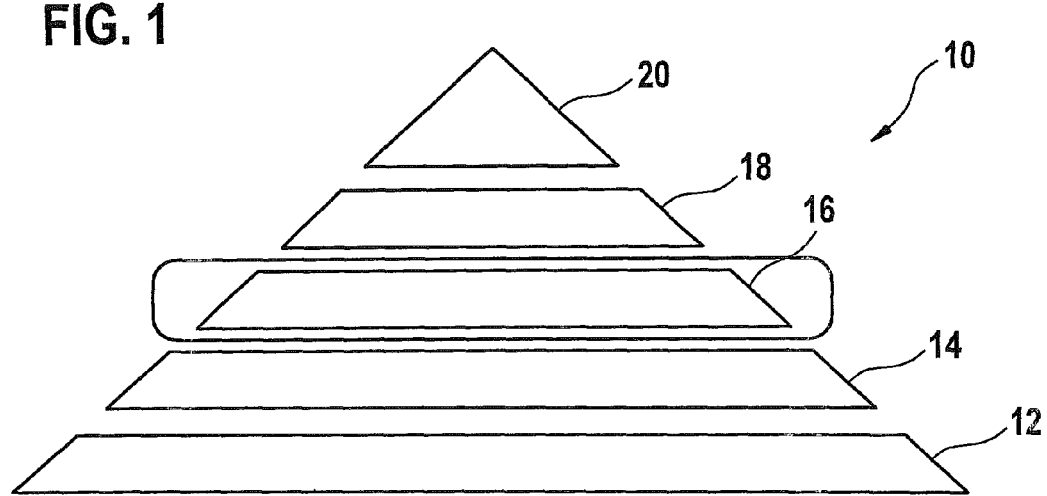
FIG. 1 shows a trust pyramid.

The present invention is represented schematically in the drawing on the basis of specific embodiments and described in the following text with reference to the drawing.

To trust an IT system that it will always act as expected requires trust in all of the incorporated layers, one after the other, in order to create a trustworthy IT system.

FIG. 1 shows a trust pyramid for a typical IT system. It is provided with reference number 10 overall and includes one layer for organizational security 12, one layer for system security 14, one layer for hardware security 16, one layer for software security 18, and an uppermost layer for trust 20.

Trust in the entire IT system requires that each layer be able to rely on the effective security of the layer situated underneath, without having the ability to verify this fact independently. For example, this means that it is possible that a perfect software and hardware security solution may turn out to be useless because of a weak security system configuration situated underneath. Moreover, it may be the case that a potential weakness in the system configuration will not be detected or prevented by the upper hardware and software layers.

In contrast to typical back and IT systems, the hardware layer of embedded systems is frequently exposed to physical attacks that influence hardware or software functionalities through a physical arrangement, e.g., manipulate a flash memory or deactivate alarm functionalities. One particular approach for making such physical attacks more difficult is the use of manipulation-proof hardware security modules (HSM), such as those shown in FIG. 2, for instance. Such an HSM protects important information, for example personal identification numbers (PIN), secure keys and critical operations such as a PIN verification, data encryption, e.g., by strong physical shielding.

The manner in which an HSM may be developed and the kind of functionalities it is able to perform in order to improve the security of an embedded system will be illustrated in the following text.

Figure 2:
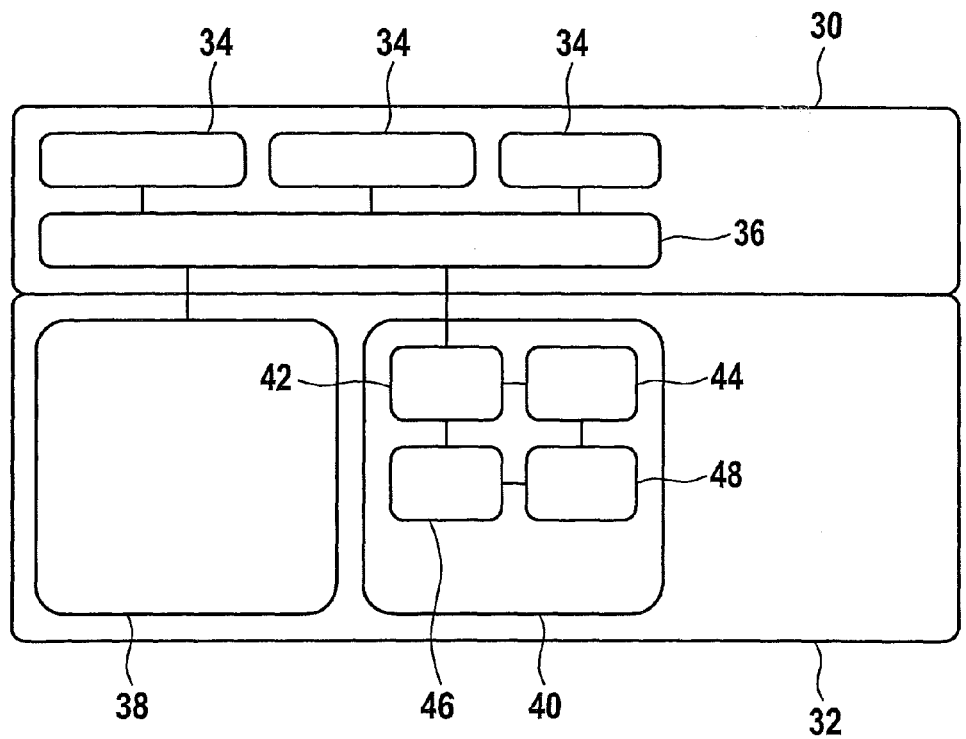
FIG. 2 shows functionalities of an HSM in a schematic representation.

FIG. 2 depicts the core functionalities of a typical hardware security module. The illustration shows a software layer 30 and a hardware layer 32, which is protected against unauthorized access.

Software layer 30 includes a number of applications 34, of which three are illustrated here. An operating system 36 is provided in addition. Hardware layer 32 includes embedded standard hardware 38 as well as a hardware security module (HSM) 40. A first block 42 in this HSM 40 is provided for interfaces and the control, a second block 44 is provided for secure encryption functionalities, a third block 46 is provided for secure functionalities, and a secure memory 48 is included.

Secure memory 48 is a small, non-volatile data memory, e.g., having a capacity of a few kB, within manipulation-proof HSM 40, so that an unauthorized readout or a manipulation or deletion of critical information, e.g., of cryptographic keys, cryptographic certificates or authentication data such as PINs or passwords, is prevented. In addition, secure memory 48 of HSM 40 holds all HSM configuration information, such as information pertaining to the owner of HSM 40, or access authorizations to secure internal units.

Second block 44 for secure encryption functionalities holds cryptographic algorithms used for data encryption and decoding, such as AES or 3DES, data integration strengthening, such as MAC or HMAC, or a data origin verification, e.g., through the use of digital signature algorithms such as RSA or ECC, as well as all associated cryptographic activities, such as key generation and key verification, for instance.

Secure functionalities in third block 46 include all protected functionalities that are not directly assigned to a cryptographic method, HSM 40 serving as physically protected "trust anchor". For example, this may be a physically protected clock signal, an internal random-number generator, a loading routine protection mechanism or some other critical application functionality, such as for realizing a secure dongle.

First block 42 for interfaces and the control includes the internal HSM logic, which implements the HSM communication with the external world and administers the operation of all internal basic components such as the ones previously mentioned.

All functional basic components of hardware security module 40, as described above, are surrounded by an uninterrupted physical boundary, which prevents internal data and processes from being monitored, copied or cloned or manipulated. This could make it possible for an unauthorized user to use or compromise internal secrets. The cryptographic boundary is commonly implemented by algorithmic and physical time channel countermeasures with a dedicated access protection arrangement, such as special shielding or coatings in order to enable side channel resistance, access reporting, access resistance or an access response, for instance.

The manner in which HSM 40 is able to improve the security of an embedded product solution will be elucidated in the following text.

HSM 40 protects critical information, e.g., identities, cipher keys or keys, with the aid of the physical shield that cannot be circumvented by software susceptibility.

HSM 40 is able to assist in detecting, weakening or deterring powerful POI attackers (POI=point of interest), by implementing effective side channel resistance and access protection barriers, which, among other things, have severe access restrictions that apply even to authorized users. For example, some information is always held within HSM 40 exclusively.

HSM 40 is able to accelerate security mechanisms in which certain acceleration switching circuits are utilized.

The use of HSM 40 makes it possible to reduce the security costs by adding highly optimized special switching circuits, for instance for standardized cryptography.

Figure 3:
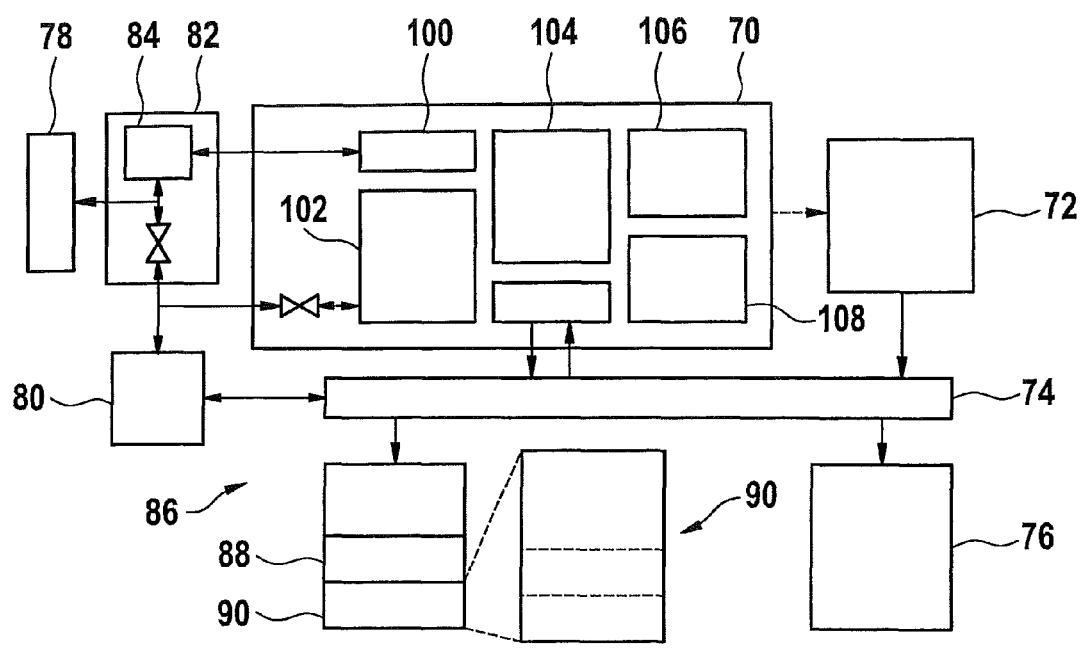
FIG. 3 shows the structure of one specific embodiment of the HSM in a schematic representation.

One possible structure of the HSM is shown in FIG. 3. It shows HSM 70, which is embedded in an environment. The figure depicts a main computer unit 72, a system bus 74, a RAM component 76 having an area for joint use, and a test program 78 or debugger including associated hardware 80 and interface 82, the latter in turn including a register 84. Moreover, the figure shows a memory component 86 for flash code having a data area 88 and a secure area 90, in which secure core data are contained.

Provided in HSM 70 are an interface 100 with respect to test program 78, a secure computer core 102, a secure RAM component 104, a random-number generator 106, e.g., a TRNG or PRNG, and a key 108, e.g., AES.

The hypervisor includes both the standard functionality of the operating system, also known as scheduling, memory access and access to the hardware or basic software functionalities via defined programming interfaces or APIs (application programming interface). The hypervisor can be realized using the already existing memory protection unit (MPU), which makes it possible to specify access to defined memory areas for applications either in the system or user mode.

The configuration takes place in such a way that all system and hardware resources are located accordingly and are "reachable" only via the hypervisor. The applications themselves are configured into different address ranges and executed only in user mode with restricted access rights.

System functionalities realized in software that are to be protected, e.g., secure libraries or SecuLibs etc., are linked to the hypervisor, similar to the hardware resources, and operated in system mode. The separation of the resources of the individual applications includes both the program area and the associated data of the particular application. Access to data of the adjacent application is not possible. This applies in particular also to the keys. This structure allows new applications to be integrated into the system as well with little effort.

When the hypervisor is used in the main computer or main computer core as well, the current security anchor is expanded to include the main computer. With the aid of the secure boot feature together with the hypervisor in the HSM, the hypervisor code in the main computer is secured during the control unit run-up.

Figure 4:
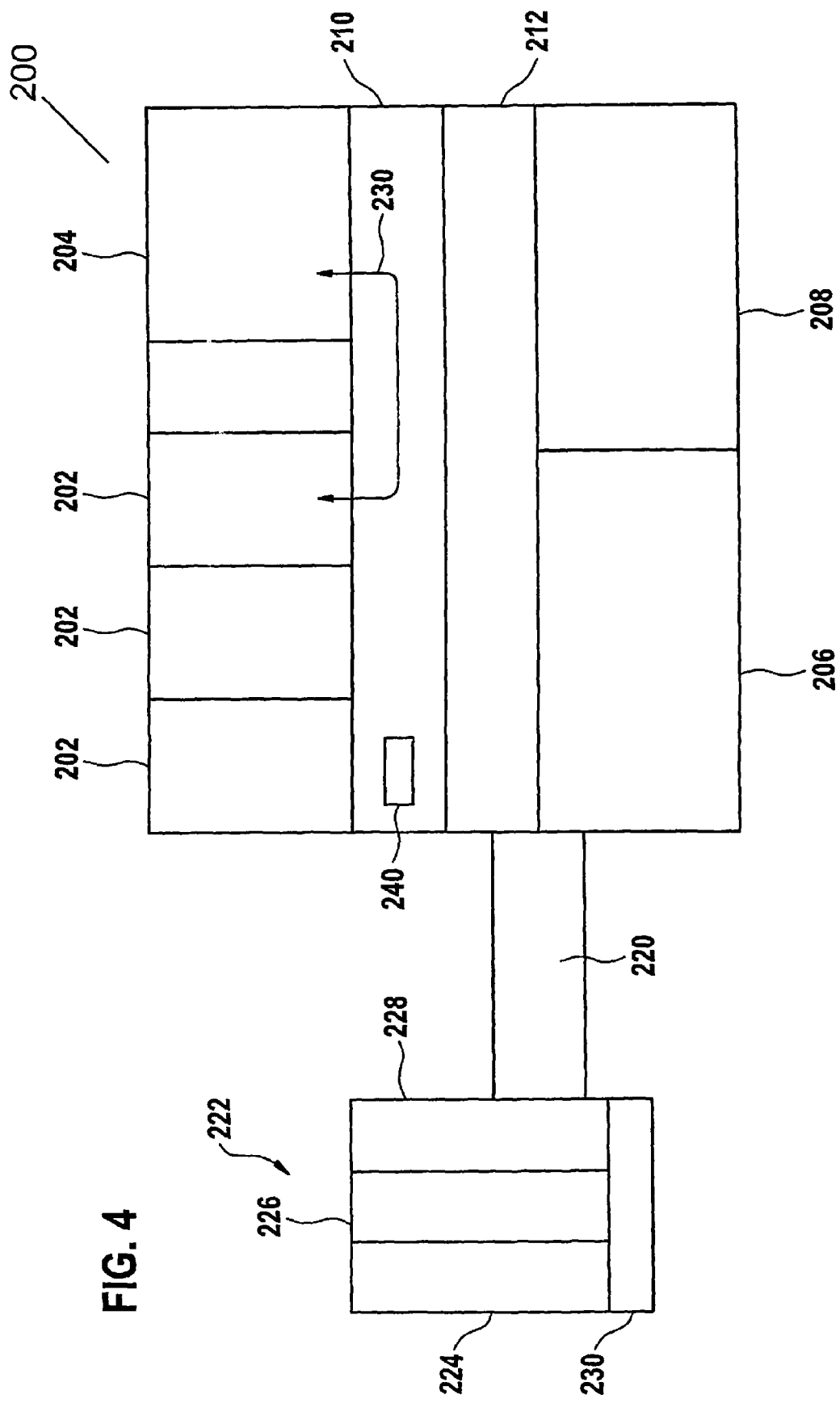
FIG. 4 shows a specific embodiment of the HSM.

FIG. 4 shows one embodiment of an HSM in order to illustrate the method. The figure shows an HSM 200 with areas 202 for application programs, and a further area 204 for secure libraries. In addition, an area 206 for keys and an additional area 208 for random-number generators, TRNG or PRNG, are provided. Furthermore, a hypervisor 210 including MPU 240 (MPU: memory protection unit), and a microcontroller abstraction layer MCAL 212 are provided. Access of the application programs to the secure libraries takes place via hypervisor 210, as illustrated by an arrow 230. Access to software functionalities thus occurs by way of hypervisor 210. However, in this specific development, it is newly possible to access hardware resources and secure libraries via hypervisor 210 as well, should this be necessary.

In addition, the figure shows a system bus 220, by way of which HSM 200 is connected to a main computer 222. There, a first area 224 is provided for application programs, a second area 226 is provided for the communication, and a third area 228 is provided for memory access. In addition, an area 230 is available as an interface to HSM 200.

What is claimed is:

1. A method for monitoring an electronic hardware security module, which is in a control unit, the method comprising:
    executing a hypervisor, in the electronic hardware security module, to regulate memory accesses requested by software application executed in the electronic hardware security module, wherein the electronic hardware security module executes a cryptographic algorithm and stores secret data used by the cryptographic algorithm, and wherein the implementing separates the cryptographic algorithm and the secret data from the software application by restricting the requested memory accesses to allocated memory, and wherein access to the software functionalities and the hardware resources are possible only via a defined application programming interface (API).

2. The method of claim 1, wherein the hypervisor is employed in conjunction with an MPU, which specifies memory accesses.

3. The method of claim 1, wherein hardware resources are accessed.

4. The method of claim 3, wherein software functionalities are accessed, wherein cryptographic functionality can only be called up by an API that is not defined for the software application.

5. The method of claim 1, wherein software functionalities are accessed.

6. The method of claim 5, wherein secure libraries are accessed.

7. The method of claim 1, wherein the hypervisor is also used in a main computer of the control unit.

8. The method of claim 7, wherein the hypervisor is secured in a run-up of the control unit in the main computer.

9. An electronic hardware security module, comprising:
    a computer unit; and
    a memory storing program code which, when executed by the computer unit, executes a hypervisor, in the electronic hardware security module, to regulate memory accesses requested by software application executed in the electronic hardware security module, wherein the electronic hardware security module executes a cryptographic algorithm and stores secret data used by the cryptographic algorithm, and wherein the implementing separates the cryptographic algorithm and the secret data from the software application by restricting the requested memory accesses to allocated memory, and wherein access to the software functionalities and the hardware resources are possible only via a defined application programming interface (API).

10. The electronic hardware security module of claim 9, wherein the hypervisor is configured to access hardware resources.

11. The electronic hardware security module of claim 10, wherein the hypervisor is configured to access software functionalities, wherein cryptographic functionality can only be called up by an API that is not defined for the software application.

12. The electronic hardware security module of claim 9, wherein the hypervisor is configured to access software functionalities.

* * * * *